Patented July 8, 1952

2,602,871

UNITED STATES PATENT OFFICE 2,602,871

NICKEL WELDING

Robert A. Noland and Chester T. Szymko, Chicago, Ill., assignors to the United States of America as represented by the United States Atomic Energy Commission No Drawing. Application September 19, 1950, Serial No. 185,694

4 Claims. (Cl. 219—10)

This invention deals with a process for welding nickel and nickel-base alloys and in particular with a process of inert gas-shield arc welding.

It is an object of this invention to provide a process for nickel welding with which a weld of low porosity and consequently of high density is obtained.

It is another object of this invention to provide a process for nickel welding with which a pressure-tight, leak-free weld is obtained.

These and other objects are accomplished by using a shield gas during the arc welding proper that consists essentially of from 5-15% by volume of hydrogen and the remainder of argon. A ratio of about 11% by volume of hydrogen and 89% by volume of argon has been found especially satisfactory.

It was found that the hydrogen has not only an oxidation-preventing effect but that it also has a bearing on the solubility of gases, namely, that of decreasing the number and size of gas pockets thereby increasing the density of the weld. This result cannot be obtained, as tests showed, with other inert gases, particularly not with helium gas or nitrogen.

The conditions preferably used are those known to everybody skilled in arc welding. The current used is not critical, but especially satisfactory results have been obtained with a straight-polarity direct current. For welds of a thickness ranging from 0.020 to 0.062 in., a current density of from 15-25 amperes was found satisfactory. In this case, a tungsten electrode of a diameter ranging from 0.04 to 0.062 in. proved very favorable. The process may be carried out with or without the use of a filler rod.

The pressure and flow of the gas mixture are also not critical. A pressure of approximately 15 lbs. gauge for each gas has been used with satisfaction in most instances; the hydrogen gas was ignited before the actual welding began. A flow of the gas mixture of from 8 to 10 liters/min. was found satisfactory.

In the following an example is given illustrating one preferred embodiment of this invention.

Example

A nickel tip was welded to a nickel tube having three fins by using a direct straight-polarity current of 43 amperes. The shield gas consisted of 8 parts by volume of argon and 1 part by volume of hydrogen which is 88.9% by volume of argon and 11.1% by volume of hydrogen gas. The argon used had a purity of 98.6%. The weld obtained was practically nonporous and characterized by great mechanical strength.

The process of the invention is applicable to nickel and to nickel-base alloys in which nickel is the predominant component. Using argon alone as a shield gas, quite porous welds were obtained.

The process is of particularly great utility in preparing a hermetic seal because, due to the substantial lack of porosity, a leak-proof weld is obtained thereby. This is of prime importance in the production and in particular in the sealing of nickel or nickel-coated containers.

It will be understood that this invention is not to be limited to the details given herein but that it may be modified within the scope of the appended claims.

What is claimed is:

1. A process which comprises arc welding nickel and nickel-base alloys using a shield gas mixture containing from 5-15% by volume of hydrogen and from 95-85% by volume of argon.

2. The process of claim 1 wherein the shield gas mixture consists of approximately 11% by volume of hydrogen and 89% by volume of argon.

3. A shield gas mixture for arc welding consisting essentially of 5-15% by volume of hydrogen and 95-85% by volume of argon.

4. A shield gas mixture for arc welding consisting essentially of 11% by volume of hydrogen and 89% by volume of argon.

ROBERT A. NOLAND.
CHESTER T. SZYMKO.

REFERENCES CITED

The following references are of record in the file of this patent:

UNITED STATES PATENTS

| Number | Name | Date |
|---|---|---|
| 734,522 | Edison | July 28, 1903 |
| 2,003,167 | Alexander | May 28, 1935 |
| 2,053,417 | Brace | Sept. 8, 1936 |
| 2,497,631 | Rothschild | Feb. 14, 1950 |
| 2,522,482 | Olzak | Sept. 12, 1950 |

FOREIGN PATENTS

| Number | Country | Date |
|---|---|---|
| 10,466 | Australia | Dec. 7, 1932 |